United States Patent
Sachs et al.

(10) Patent No.: US 9,069,373 B2
(45) Date of Patent: Jun. 30, 2015

(54) GENERATING A RUNTIME FRAMEWORK

(75) Inventors: Nadine Sachs, Wiesloch (DE); Dirk Baumgaertel, Hockenheim (DE); Ulrich Bestfleisch, Schwetzingen (DE); Gerrit Simon Kazmaier, Heidelberg (DE); Karl-Peter Nos, Nussloch (DE); Sebastian Schroetel, Heidelberg (DE)

(73) Assignee: SAP SE, Walldorf (DE)

( * ) Notice: Subject to any disclaimer, the term of this patent is extended or adjusted under 35 U.S.C. 154(b) by 742 days.

(21) Appl. No.: 13/335,939

(22) Filed: Dec. 23, 2011

(65) Prior Publication Data

US 2013/0166892 A1    Jun. 27, 2013

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/00 | (2006.01) |
| G06F 17/30 | (2006.01) |

(52) U.S. Cl.
CPC ............ *G06F 9/00* (2013.01); *G06F 17/30592* (2013.01)

(58) Field of Classification Search
CPC .............................. G06F 9/00; G06F 17/30592
USPC .......................................................... 719/320
See application file for complete search history.

(56) References Cited

U.S. PATENT DOCUMENTS

| | | | | |
|---|---|---|---|---|
| 6,594,672 | B1 * | 7/2003 | Lampson et al. ...................... 1/1 |
| 7,693,860 | B2 * | 4/2010 | Babanov et al. ............. 715/212 |
| 8,775,473 | B2 * | 7/2014 | Anzalone et al. ............ 707/791 |
| 2004/0122844 | A1 * | 6/2004 | Malloy et al. ................. 707/102 |
| 2004/0139061 | A1 * | 7/2004 | Colossi et al. .................... 707/3 |
| 2007/0250524 | A1 * | 10/2007 | Le ................................ 707/102 |

\* cited by examiner

*Primary Examiner* — Timothy A Mudrick

(57) ABSTRACT

In an embodiment, the runtime framework is responsible for executing multidimensional analytical metadata in a runtime environment that is determined by the runtime framework. To generate such a runtime framework, the received multidimensional analytical metadata is analyzed to determine a type of an associated calculation pattern. Based upon the type, subsets of the multidimensional analytical metadata and corresponding runtime decision rules are determined. To execute the subsets, executable conditions corresponding to the multidimensional analytical metadata are identified. Based upon the executable conditions, the calculation pattern associated with the multidimensional analytical metadata is executed by executing the associated subsets, and the runtime framework is generated. The runtime framework determines calculation scenario executable subsets and calculation scenario inexecutable subsets that are associated with the multidimensional analytical metadata, and executes the subsets in their respective engines.

17 Claims, 5 Drawing Sheets

GENERATING A RUNTIME FRAMEWORK

RELATED APPLICATIONS

This application is related to three co-pending U.S. Applications—
1. U.S. application Ser. No. 13/335,935 having titled 'GENERATING A COMPILER INFRASTRUCTURE', filed on Dec. 23, 2011;
2. U.S. application Ser. No. 13/335,937 having titled 'EXECUTING RUNTIME CALLBACK FUNCTIONS', filed on Dec. 23, 2011; and
3. U.S. application Ser. No. 13/335,938 having titled 'DYNAMIC RECREATION OF MULTIDIMENSIONAL ANALYTICAL DATA', filed on Dec. 23, 2011, all of which are herein incorporated by reference in its entirety for all purposes.

FIELD

The field generally relates to computer systems and software, and more particularly to various methods and systems to generate a runtime framework.

BACKGROUND

In computing, Online Analytical Processing (OLAP) tools enable users to interactively analyze multidimensional data from various perspectives. Applications of OLAP include business reporting for sales, marketing, management reporting, business process management, budgeting and forecasting, financial reporting and the like. OLAP processors use data stored in in-memory databases for analytical processing. An in-memory database is a database management system that primarily relies on volatile memory for computer data storage. A plurality of data sources may be associated with such an in-memory database, and each of the data sources may have unique properties. To execute various data related operations corresponding to the various data sources, an execution platform may be required.

SUMMARY

Various embodiments of systems and methods to generate a runtime framework are disclosed. In an embodiment, the runtime framework is responsible for executing multidimensional analytical metadata in a runtime environment that is determined by the runtime framework. To generate such a runtime framework, the received multidimensional analytical metadata is analyzed to determine a type of an associated calculation pattern. Based upon the type of calculation pattern associated with the multidimensional analytical metadata, subsets of the multidimensional analytical metadata and corresponding runtime decision rules are determined. To execute the subsets, executable conditions corresponding to the multidimensional analytical metadata are identified. In an embodiment, the identifying the executable conditions include determining calculation scenario executable subsets and calculation scenario inexecutable subsets. Based upon the executable conditions, the calculation pattern associated with the multidimensional analytical metadata is executed by executing the associated subsets, and the runtime framework is generated. Based upon the determination of the calculation scenario executable subsets and the calculation scenario inexecutable subsets, the runtime framework executes the subsets in their respective engines, for instance in an in-memory computing engine for calculation scenario executable subsets; and in an application scenario for calculation scenario inexecutable subsets.

In an embodiment, a system includes a processor to read and execute instructions stored in a memory element that is in communication with the processor. The memory includes instructions to execute the generation of the runtime framework. The processor may be in communication with various compilation modules including a database, a runtime analyzer, a runtime execution engine, a metadata buffer and the like to generate the runtime framework.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
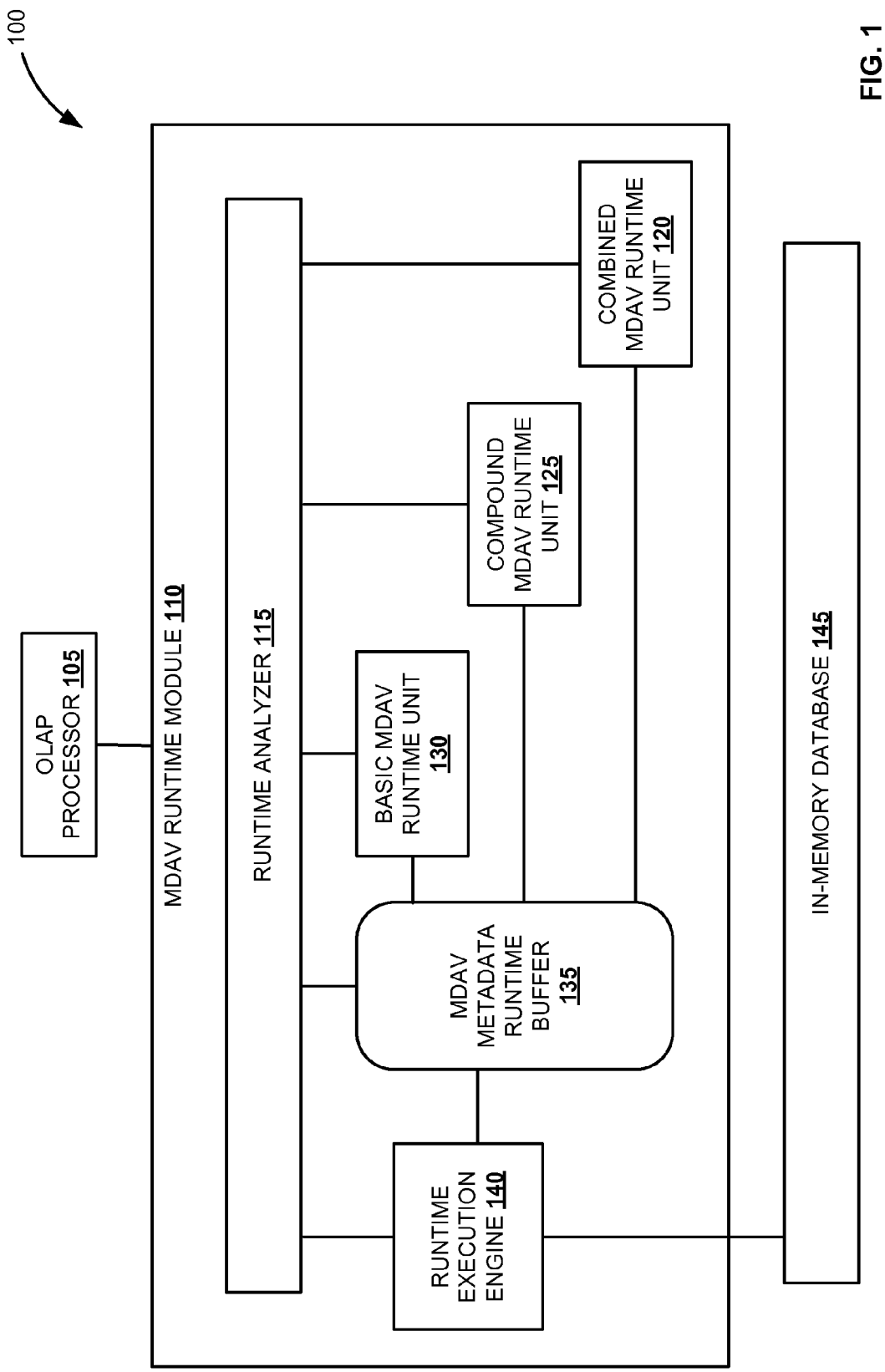
FIG. 1 is a block diagram illustrating an overall architecture of a system to generate a runtime framework, according to an embodiment.

Embodiments of techniques for systems and methods to generate a runtime framework are disclosed. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Business data warehouse of an enterprise is a repository of an enterprise's data where the data is standardized, structured, integrated, and managed. Metadata associated with the data warehouse defines contents of the data warehouse and the functioning of the data present in the data warehouse. Metadata of various traditional business data warehouse are replaced by multidimensional analytical views (MDAVs), which represent a business object based metadata model for analytics. The analytics include computer technology, operational research, and statistics to solve different problems in business and industry scenarios such as enterprise decision management, marketing analytics, portfolio analysis, credit risk analysis, and the like. Metadata associated with the MDAV (referred to as "MDAV metadata") may be stored in an in-memory computing engine.

The in-memory computing engine is a part of applications that are built using in-memory technology. In-memory technology is a database management technology that stores computer related data on main memory. Since the information is stored on main memory, processing of all data transactions are executed on main memory without having to access the external storage media, thereby reducing I/O reading activity when querying a database. The in-memory computing combines transactions and analytics to provide efficient storage, search and ad-hoc analysis of real-time information. In-memory analytics may be described as an approach to query data residing on the main memory, resulting in quick response time. In-memory computing applications are built based on business driven use cases, specifically in industries requiring processing of large data volumes or real-time processing such as banking, retail, utilities/energy, and telecommunications. Examples where in-memory technology may be applied to build business applications include: demand forecasting based on huge data volumes provided by smart meter devices in utilities industries; managing energy cost in energy intensive industries with in-memory analytics and forecasting based on fine grained consumption data; trade promotion management solutions for retailers and consumer products companies with high data volumes; real-time risk management and cumulated risks calculation for insurance companies in the corresponding area; internal and external risk management and regulatory reporting for banking sector; and the like.

In an embodiment, the in-memory computing engine is configured to execute the data stored in an in-memory database of a computing device. The execution of the data may render an outcome of a business application associated with the in-memory computing engine. The in-memory computing engine is associated with a runtime module accessed during a runtime execution of the data; and a compile time module accessed while compiling the computing engine. The in-memory computing engine includes a calculation engine to generate calculation patterns or calculation rules defined for the in-memory computing engine (e.g. data operations such as union, join, filtering temporal data, and so on); and to execute calculation scenarios representing a group of operations (e.g., mathematical operations). When the calculation patterns are executed by a calculation engine in the in-memory computing engine, a set of calculation scenarios are created. The result from the execution of the calculation scenarios is sent to an MDAV runtime module, which further forwards it to an OLAP processor. The calculation engine can work with multiple inputs from multiple table-types such as OLAP-views, JOIN-tables, physical-tables, and the like. The calculation engine can also combine and transform these table types in multiple ways, for example by using predefined operations like join, projection, aggregation, etc. Further, the calculation engine allows customizable operations by including Python-scripts, R-scripts, or L-scripts and thus allowing basically any kind of data transformation.

A runtime module is responsible to execute the MDAV metadata in runtime and further forward it to the OLAP processor for analytical processing. The runtime module receives data from various data sources, including resultant data from join operation, union operation, intersection operation, planning operation or the like. Execution of some of the received MDAV data may be associated with corresponding specific runtime environment or runtime execution units. Determination of the runtime environment for each MDAV metadata is required for executing the MDAV metadata. A runtime framework provides a platform to determine the runtime environment for any type of MDAV metadata received for execution. To generate the runtime framework, the MDAV metadata received is analyzed to determine the type of data operations (e.g. calculation patterns). Further, the runtime framework determines an execution engine to execute the MDAV metadata. In an embodiment, based upon calculation scenario executable components associated with the MDAV, the runtime framework may assign the execution of such MDAV metadata into an in-memory computing engine. In another embodiment, based upon calculation scenario inexecutable components associated with the MDAV, the runtime framework may assign the execution of such MDAV metadata into an application server. Based upon the execution engine, the MDAV metadata is executed in runtime.

FIG. 1 is a block diagram illustrating an overall architecture of a system to generate a runtime framework, according to an embodiment. System 100 includes OLAP processor 105, MDAV runtime module 110, runtime analyzer 115, combined MDAV runtime unit 120, compound MDAV runtime unit 125, basic MDAV runtime unit 130, MDAV metadata runtime buffer 135, runtime execution engine 140 and in-memory database 145. OLAP processor 105 is responsible for performing analytical processing of multidimensional data according to a business requirement. In an embodiment, in-memory database 145 includes many data sources that are involved in performing corresponding data operations. To execute the data available at runtime and provide OLAP processor 105 with a resultant of the execution, MDAV runtime module 110 is configured to generate the runtime framework during system runtime. In an embodiment, MDAV runtime module 110 is configured to develop a generic framework to determine a runtime executable environment for any received MDAV metadata, and execute the MDAV metadata in the corresponding runtime environment.

Accordingly, in an embodiment, in-memory database 145 renders multidimensional metadata (MDAV metadata) to MDAV runtime module 110. In-memory database 145 may render the MDAV metadata based upon a compilation execution of calculation scenarios associated with MDAV metadata. Runtime analyzer 115 analyzes this MDAV metadata to determine a type of an associated calculation pattern. Analyzing the MDAV metadata includes examining the MDAV metadata to determine a calculation pattern associated with it, and to determine a type of the calculation pattern. For example, a type of calculation pattern may be a UNION type. In an embodiment, runtime analyzer 115 queries MDAV metadata runtime buffer 135 to retrieve a type of calculation pattern corresponding to the MDAV metadata. Runtime analyzer 115 determines a corresponding MDAV runtime unit (for. eg. 120, 125, 130) based upon the type of the calculation pattern. For instance, if the calculation pattern is of a BASIC type, basic MDAV runtime unit 130 is invoked; if the calculation pattern is of a JOIN type, combined MDAV runtime unit 120 is invoked; if the calculation pattern is of a PLANNING type, compound MDAV runtime unit 125 is invoked. Runtime analyzer 115 instructs the corresponding MDAV runtime unit to establish a connection with MDAV metadata runtime buffer 135.

Based upon the type of calculation pattern, runtime analyzer 115 determines one or more subsets or members of the MDAV metadata from MDAV metadata runtime buffer 135 via a corresponding MDAV runtime unit. Subsets of the MDAV metadata may represent one or more data operations associated with the calculation pattern. For instance, join operation, union operation, intersection operation, planning operation, and the like. Each subset may have second level subsets or members of the subset of the MDAV metadata. In an embodiment, runtime analyzer 115 determines runtime decision rules along with the subsets of MDAV metadata. Further, runtime analyzer 115 identifies executable conditions associated with the MDAV metadata to execute the subsets of the MDAV metadata. An executable condition may be determined based upon the type of an associated execution pattern. An executable condition may also be determined based upon determining calculation scenario executable MDAV metadata and/or subsets of calculation scenario executable MDAV metadata. A calculation scenario executable MDAV metadata includes a MDAV metadata for which a calculation scenario may be generated and executed in the in-memory computing engine.

Identifying the executable condition may include determining the calculation executable scenario subsets of the MDAV metadata and determining the calculation scenario inexecutable subsets of the MDAV metadata. These executable conditions are identified to execute the subsets of the MDAV metadata. Based upon the executable condition, MDAV runtime module 110 generates the runtime framework by instructing runtime execution engine 140 to execute the calculation pattern associated with the MDAV metadata in a corresponding engine residing associated with in-memory database 145. For instance, the calculation executable scenario subsets of the MDAV metadata are executed in an in-memory computing engine and the calculation scenario inexecutable subsets of the MDAV metadata are executed in an application server.

In an embodiment, the MDAV metadata may be internally represented as a tree structure illustrating a hierarchical arrangement of one or more types of calculation patterns, one or more subsets of the MDAV metadata, and the like. Subsets of the MDAV metadata represent join operation, union operation, intersection operation, planning operation, and the like. Some of these subsets are basic subsets, some are combined subsets and some are compound subsets depending upon the type of corresponding calculation pattern. Subsets that are combined or compound may have second level subsets or members of the subset of the MDAV metadata.

For instance, a primary MDAV metadata is received from in-memory database 145, where the primary MDAV metadata represents a first level in the hierarchical arrangement. Runtime analyzer 115 determines a type of calculation pattern associated with the primary MDAV metadata. The type of calculation pattern represents a subordinate level in the hierarchical arrangement. Further, runtime analyzer 115 analyzes a secondary MDAV metadata associated with the type of the calculation pattern, where the secondary MDAV metadata represents a second level in the hierarchical arrangement. Runtime analyzer 115 determines one or more subsets of the secondary MDAV metadata. These subsets represent a subordinate level in the hierarchical arrangement. Runtime analyzer 115 analyzes a tertiary MDAV metadata associated with the subsets of the secondary MDAV metadata. Based upon the above determination, runtime analyzer 115 identifies executable conditions for the subsets associated with the tertiary MDAV metadata, for the secondary MDAV metadata and for the primary MDAV metadata. In an embodiment, runtime analyzer 115 may identify inexecutable conditions for the subsets associated with the tertiary MDAV metadata, for the secondary MDAV metadata and for the primary MDAV metadata. In another embodiment, runtime analyzer 115 determines calculation scenario executable tertiary MDAV metadata, calculation scenario executable secondary MDAV metadata and calculation scenario executable primary MDAV metadata. Runtime execution engine 140 executes the tertiary MDAV metadata, the secondary MDAV metadata and the primary MDAV metadata in their respective engine (for e.g. in-memory computing engine or application server).

In an embodiment, an inexecutable condition is overruled (or overridden) by providing one or more configurable parameters and configuring the MDAV metadata. Examples of configurable parameters include: force an in-memory execution, force an application server execution, delay an in-memory execution, delay an application server execution, or the like. In another embodiment, during the process of executing the MDAV metadata, runtime execution engine 140 communicates with a fallback detector to detect a runtime fallback. A fallback may occur at various instances of runtime execution of the MDAV metadata. For instance, a fallback may occur if the calculation scenario executable MDAV metadata is not being executed in the in-memory computing engine, if the calculation scenario inexecutable MDAV metadata is not being executed in the application server, if an error has occurred during data access from the data source, if the in-memory computing engine is disconnected, if the in-memory computing engine is terminated, if the in-memory computing engine is returned with an error, or the like. In such cases, a configurable parameter is provided to override the errors and amend the runtime fallback. The configurable parameter may represent an error detection and correction property to successfully execute the MDAV metadata in the respective engine.

Figure 2:
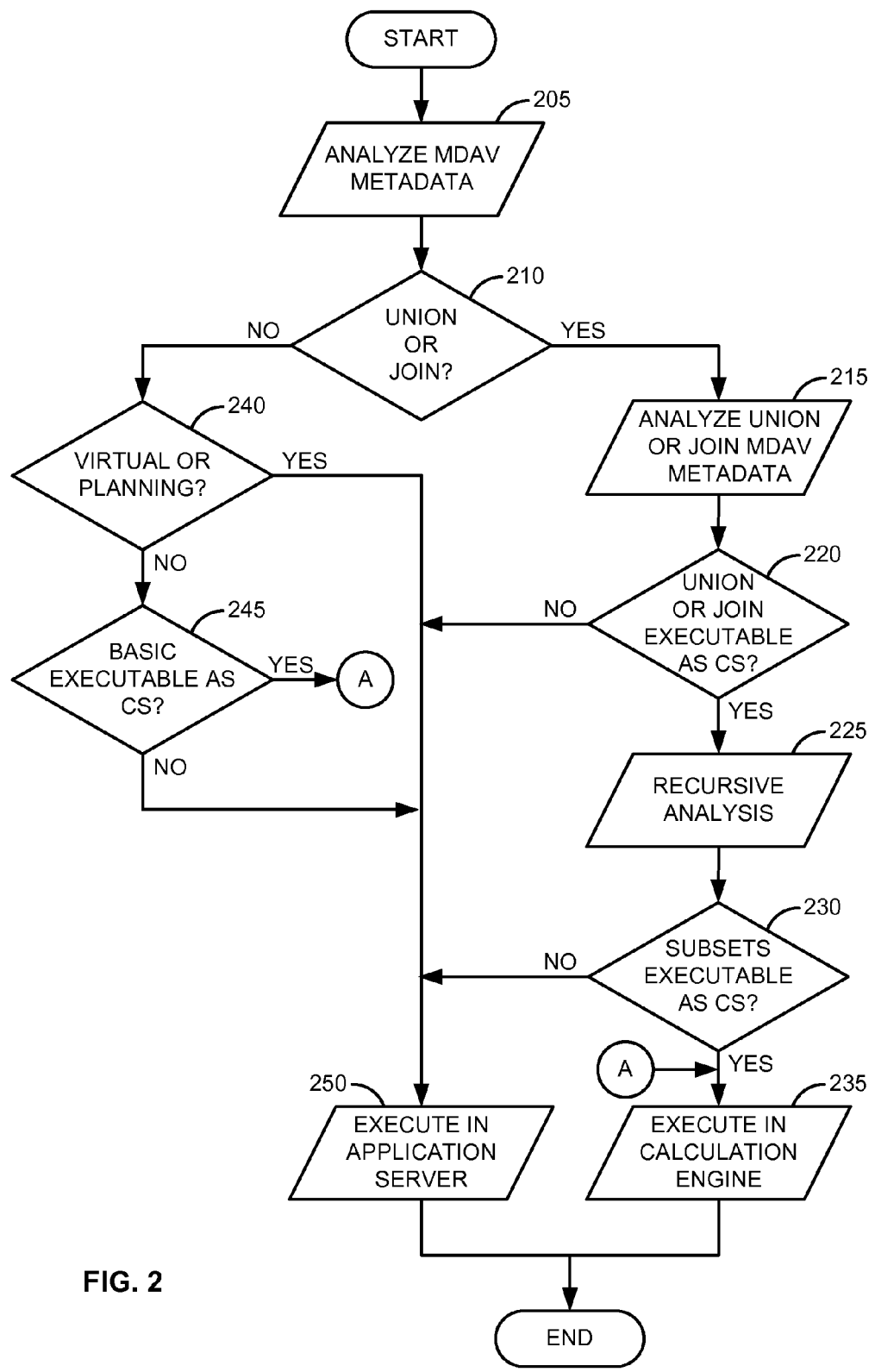
FIG. 2 is a functional flow diagram illustrating a method to generate a runtime framework, according to an embodiment.

FIG. 2 is a functional flow diagram illustrating a method to generate a runtime framework, according to an embodiment. In an embodiment, the runtime framework is responsible for executing multidimensional analytical metadata in a runtime environment that is determined by the runtime framework. To generate such a runtime framework, the received multidimensional analytical metadata is analyzed to determine a type of an associated calculation pattern. Based upon the type, subsets of the multidimensional analytical metadata and corresponding runtime decision rules are determined. To execute the subsets, executable conditions corresponding to the multidimensional analytical metadata are identified. Based upon the executable conditions, the calculation pattern associated with the multidimensional analytical metadata is executed by executing the associated subsets, and the runtime framework is generated. The runtime framework determines calculation scenario executable subsets and calculation scenario inexecutable subsets that are associated with the MDAV metadata; and executes the MDAV metadata in their respective engines.

The runtime module is responsible to execute the MDAV metadata in runtime and further forward it to the OLAP processor for analytical processing. The runtime module receives MDAV metadata from various data sources, including resultant data from join operation, union operation, intersection operation, planning operation or the like, representing one or more calculation patterns.

In functional block 205, the MDAV metadata is analyzed to determine a type of the associated calculation pattern. In decision block 210, a determination of whether the type of the calculation pattern associated with MDAV metadata is of a JOIN type or a UNION type is established. If the associated calculation pattern is of the JOIN or UNION type, the process proceeds to functional block 215. If the associated calculation pattern is not of the JOIN or UNION type, the process proceeds to decision block 240.

In functional block 215, the MDAV metadata associated with JOIN or UNION type is analyzed to determine executable conditions. In decision block 220, a determination of whether the MDAV metadata associated with the JOIN or UNION type is executable as a calculation scenario is established. In an embodiment, the determination of whether the MDAV metadata is executable as a calculation scenario is established based upon the executable conditions. If the MDAV metadata is executable as a calculation scenario, the process proceeds to functional block 225. If the MDAV metadata is not executable as a calculation scenario, the process proceeds to functional block 250.

In functional block 225, the MDAV metadata associated with JOIN or UNION type is recursively analyzed to determine subsets of the MDAV metadata. In an embodiment, a recursive analysis includes an iterative analysis of the MDAV metadata until all the subsets of the MDAV metadata are analyzed. In an embodiment, the MDAV metadata may be internally represented as a tree structure illustrating a hierarchical arrangement of one or more types of calculation patterns, one or more subsets of the MDAV metadata, and the like. The tree structure of the MDAV metadata may include one or more branches representing a combination of one or more calculation patterns, and one or more leaves associated with each branch representing a fundamental calculation pattern. While analyzing the MDAV metadata, the analysis reaches the root level of the tree structure by parsing each branch, and each leaf of the branch. Each leaf and/or each branch of the MDAV metadata tree may be associated with a different type of calculation pattern. By performing a recursive analysis, each calculation pattern is identified and a corresponding procedure of execution is applied. Thus, in functional block 225, a recursive analysis is performed to determine one or more subsets of the MDAV metadata. The subsets of the MDAV metadata may represent the branches and/or the leaves of the MDAV metadata. One or more execution procedures associated with the subset may be described as runtime decision rules.

In decision block 230, a determination whether the subsets of the MDAV metadata are executable as a calculation scenario is established. If the subsets of the MDAV metadata are executable as a calculation scenario, the process proceeds to functional block 235. If the subsets of the MDAV metadata are not executable as a calculation scenario, the process proceeds to functional block 250.

In decision block 240, a determination of whether the type of the calculation pattern associated with MDAV metadata is of a VIRTUAL or PLANNING type is established. If the associated calculation pattern is of the VIRTUAL or PLANNING type, the process proceeds to functional block 250. If the associated calculation pattern is not of the VIRTUAL or PLANNING type, the process proceeds to decision block 245.

In an embodiment, if the calculation pattern associated with the MDAV metadata is not of the type UNION, JOIN, VIRTUAL or PLANNING, the calculation pattern is considered as a basic MDAV type. A basic calculation pattern type for the MDAV metadata may represent one or more types of fundamental calculation patterns having a singular or multiple data sources accessible for data retrieval. A non-basic calculation pattern type (for e.g. UNION, JOIN, VIRTUAL or PLANNING) may represent a combination of one or more basic calculation pattern types and/or one or more non-basic calculation pattern types. A non-basic pattern type may also be referred to as a COMBINATION type of calculation pattern associated with the MDAV metadata.

In decision block 245, a determination of whether the BASIC type of the calculation pattern associated with MDAV metadata is executable as a calculation scenario is established. If the BASIC type of the calculation pattern is executable as a calculation scenario, the process proceeds to 235. The flow of the process from decision block 245 to functional block 235 is routed via a connector "A". If the BASIC type of the calculation pattern is not executable as a calculation scenario, the process proceeds to functional block 250. In functional block 250, the MDAV metadata is executable in an application server. In functional block 235, the MDAV metadata is executable in an in-memory calculation engine.

In an embodiment, executing the calculation pattern associated with the MDAV metadata further includes analyzing the MDAV metadata to determine a "COMBINATION" type of associated calculation pattern. A COMBINATION type of calculation pattern represents any combination of one or more calculation pattern types. For instance, a JOIN type, which adds metadata present in two or more tables in a data source (horizontally); or a UNION type, which combines a resultant data present in two tables into a single table (vertically); or the like. The calculation scenario executable MDAV metadata associated with the "COMBINATION" type is determined, and based upon this determination, subsets of the MDAV metadata and corresponding runtime decision rules associated with the "COMBINATION" type are determined. Further, calculation scenario executable subsets of the MDAV metadata associated with the "COMBINATION" type are determined, and based upon the determined calculation scenario executable subsets, the "COMBINATION" type of the calculation pattern is executed in an in-memory calculation engine.

In an embodiment, if calculation scenario inexecutable MDAV metadata associated with the "COMBINATION" type is determined, based upon the inexecutable MDAV metadata, the "COMBINATION" type of the calculation pattern is executed in an application server. Similarly, if calculation scenario inexecutable subsets of the MDAV metadata associated with the "COMBINATION" type are determined, based upon the inexecutable subsets of the MDAV metadata, the "COMBINATION" type of the calculation pattern is executed in an application server.

Figure 3:
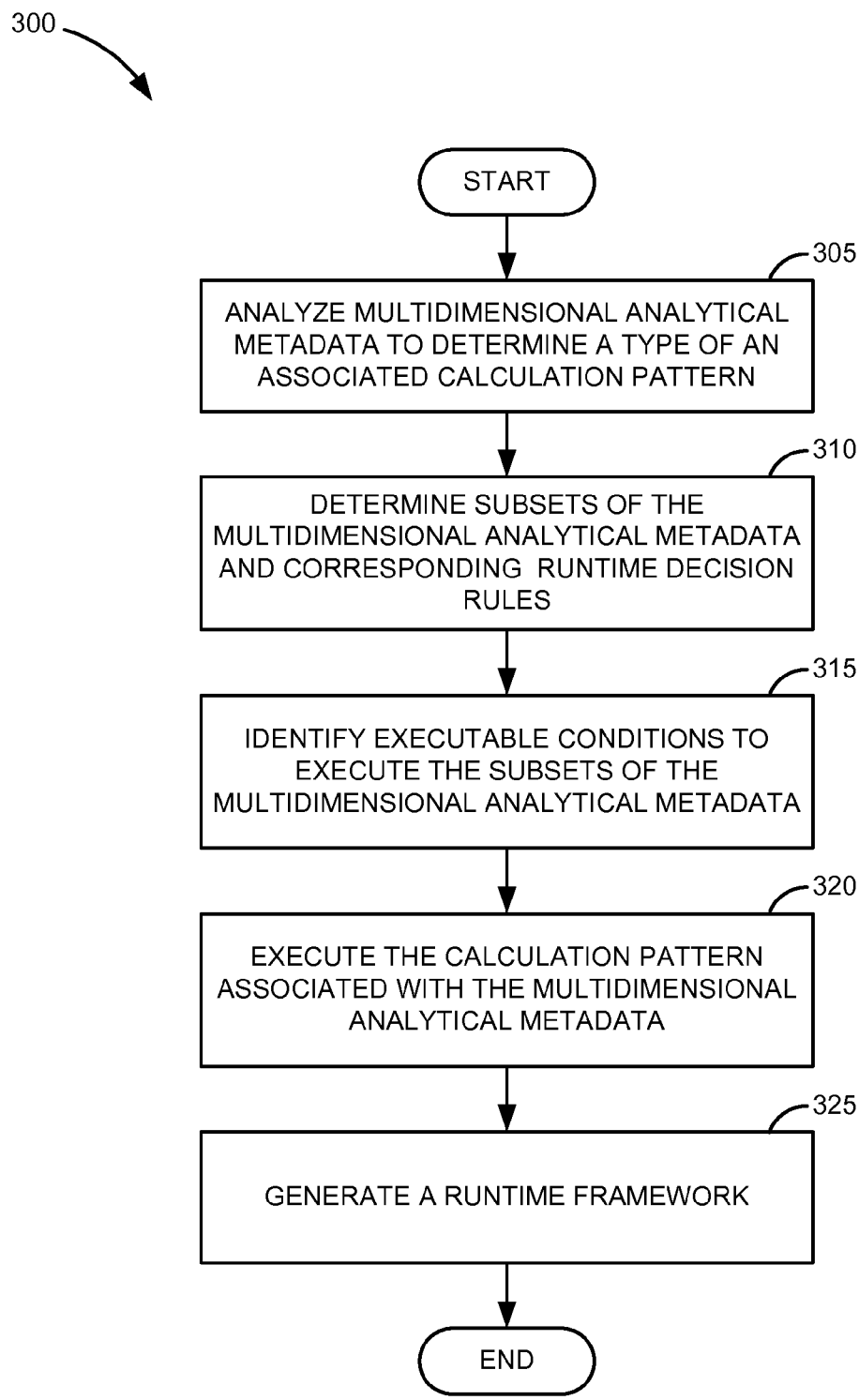
FIG. 3 is a process flow diagram illustrating a method to generate a runtime framework, according to an embodiment.

FIG. 3 is a process flow diagram illustrating a method to generate a runtime framework, according to an embodiment. The runtime framework may be responsible for executing multidimensional analytical metadata in a runtime environment that is determined by the runtime framework. A runtime module receives MDAV metadata from various data sources. In process block 305, received MDAV metadata is analyzed to determine a type of an associated calculation pattern. In process block 310, based upon the type of calculation pattern associated with the MDAV metadata, subsets of the MDAV metadata and corresponding runtime decision rules are determined. In process block 315, executable conditions corresponding to the MDAV metadata are identified to execute the subsets associated with the MDAV metadata. In an embodiment, the subsets of the MDAV metadata are executed according to the associated decision rules. In an embodiment, identifying the executable conditions include determining calculation scenario executable subsets and calculation scenario inexecutable subsets.

In process block 320, based upon the executable conditions, the calculation pattern associated with the MDAV metadata is executed by executing the associated subsets. In process block 325, the runtime framework is generated, which executes the MDAV metadata in a corresponding runtime environment. For instance, in an in-memory computing engine for calculation scenario executable subsets; and in an application scenario for calculation scenario inexecutable subsets.

Figure 4:
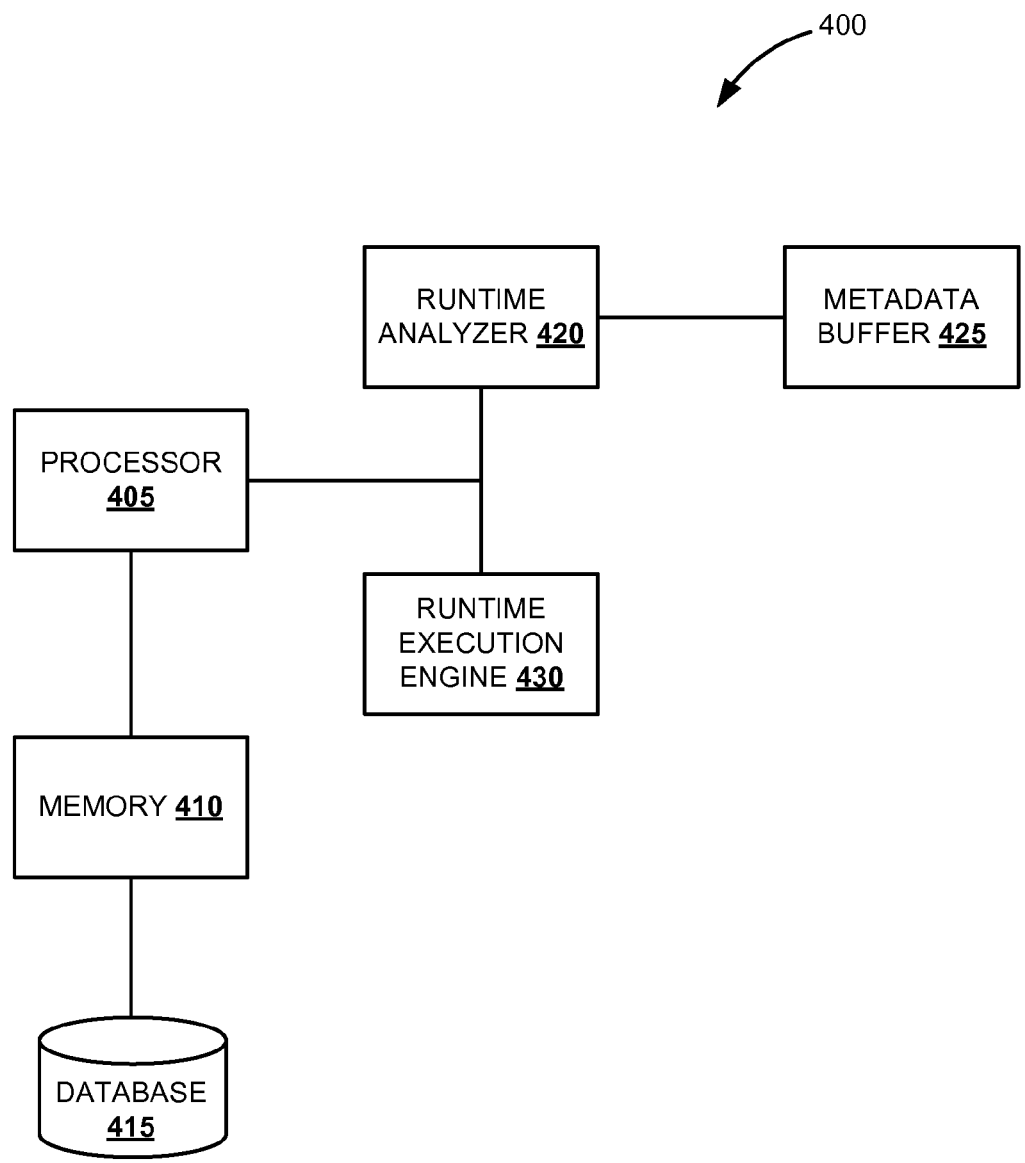
FIG. 4 is a block diagram illustrating a system to generate a runtime framework, according to an embodiment.

FIG. 4 is a block diagram illustrating a system to generate a runtime framework, according to an embodiment. System 400 includes processor 405, memory 410, database 415, runtime analyzer 420, runtime execution engine 430 and metadata buffer 425. In an embodiment, processor 405 is in communication with memory 410 and database 415. Processor 405 reads and executes instructions that are stored in memory elements 410. Memory elements 410 store the instructions to analyze a plurality of representations of business data. Processor 405 is also in communication with runtime analyzer 420 and runtime execution engine 430. Further, runtime analyzer 420 is in communication with metadata buffer 425 and runtime execution engine 430.

In an embodiment, processor 405 is triggered by a user or by the computer system to initiate an execution of MDAV metadata in runtime. Processor 405 receives the MDAV metadata and sends it to runtime analyzer 420. Runtime analyzer 420 analyzes the MDAV metadata and determines a type of a calculation pattern associated with the MDAV metadata. Runtime analyzer 420 determines subsets of the MDAV metadata and corresponding runtime decision rules from metadata buffer 425. Further, runtime analyzer 420 identifies executable conditions from metadata buffer 425 to execute the subsets of the MDAV metadata. In an embodiment, the subsets of the MDAV metadata are executed according to the associated decision rules. In an embodiment, identifying the executable conditions include determining calculation scenario executable subsets and calculation scenario inexecutable subsets.

Runtime execution engine 430 executes the calculation pattern associated with the MDAV metadata by executing subsets associated with the MDAV metadata, and generates the runtime framework. The runtime framework executes the MDAV metadata in a corresponding runtime environment, for instance, in an in-memory computing engine for calculation scenario executable subsets; and in an application scenario for calculation scenario inexecutable subsets. In an embodiment, runtime execution engine 430 is configured to identify the calculation scenario executable subsets and calculation scenario inexecutable subsets of the MDAV metadata, determined by runtime analyzer 420. Runtime execution engine 430 executes the corresponding scenario executable MDAV metadata in an in-memory calculation engine and calculation scenario inexecutable MDAV metadata in an application server. In an embodiment, system 400 includes a fallback detector (not shown in FIG. 4) that is configured to detect a runtime fallback and provide a configurable parameter to override one or more inexecutable conditions and amend the runtime fallback.

In an embodiment, metadata buffer 425 stores instructions to identify the type of calculation patterns, calculation scenario executable and inexecutable MDAV metadata, calculation scenario executable and inexecutable subsets of the MDAV metadata, and the like. Runtime execution engine 430 and runtime analyzer 420 communicate with metadata buffer 425 to access the instructions and make necessary determinations.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
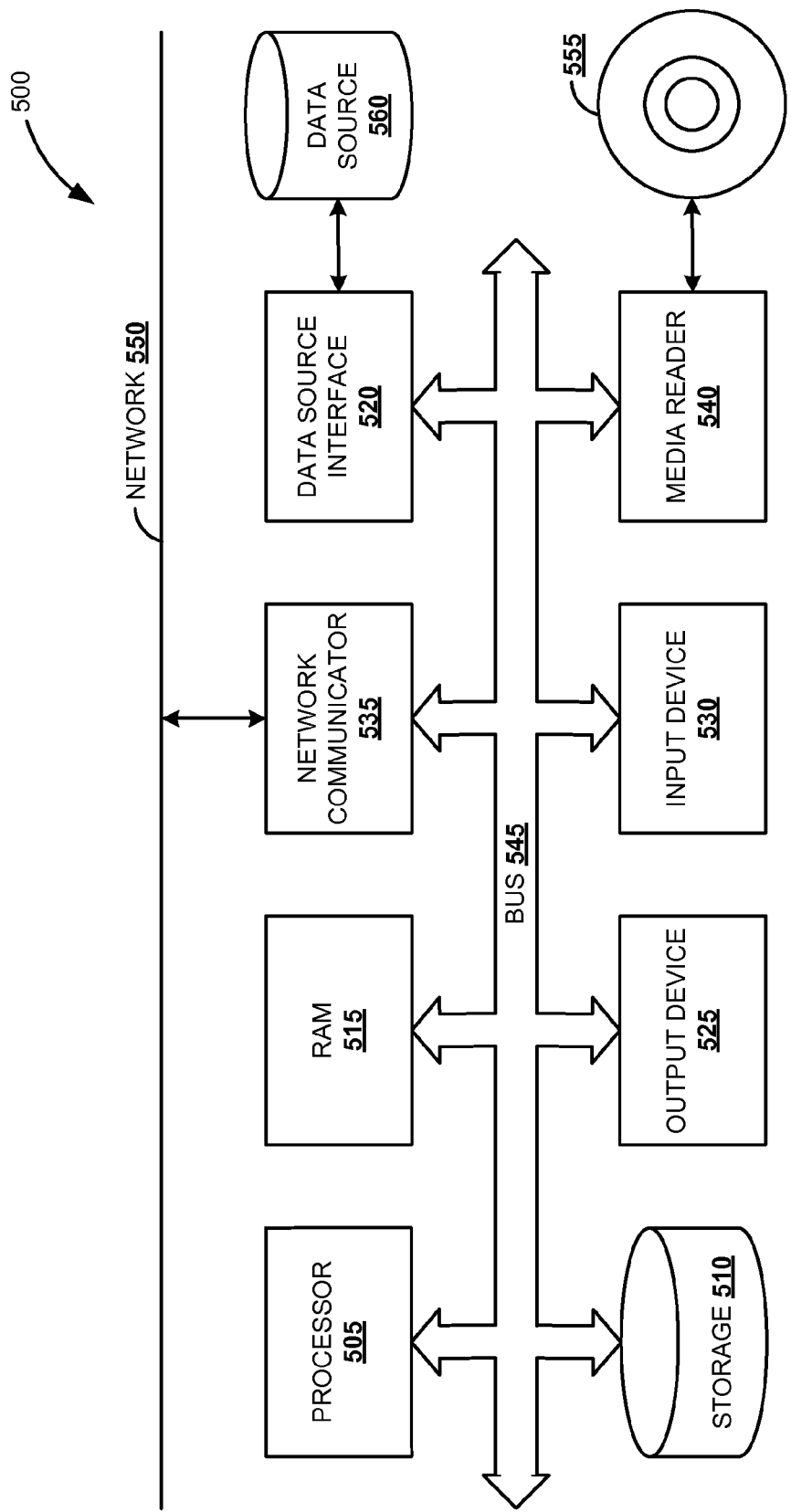
FIG. 5 is a block diagram illustrating a system, according to an embodiment.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, continuation servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to generate a runtime framework, comprising:
    analyzing a multidimensional analytical metadata to determine a type of an associated calculation pattern;
    based upon the type of the calculation pattern, a processor of the computer determining one or more subsets of the multidimensional analytical metadata and corresponding one or more runtime decision rules, wherein the one or more subsets include one or more calculation scenario executable subsets and one or more calculation scenario inexecutable subsets;
    identifying one or more executable conditions to execute the one or more subsets of the multidimensional analytical metadata; and
    based upon the executable conditions, generating the runtime framework by executing the calculation pattern associated with the multidimensional analytical metadata, wherein executing the calculation pattern comprises executing the one or more subsets of the multidimensional analytical metadata, by executing the calculation scenario executable metadata in an in-memory calculation engine, and executing the calculation scenario inexecutable metadata in an application server.

2. The computer implemented method of claim 1 further comprising:
    receiving a primary multidimensional analytical metadata including the associated calculation pattern;
    determining the type of the calculation pattern associated with primary multidimensional analytical metadata;
    analyzing a secondary multidimensional analytical metadata associated with the type of the calculation pattern;
    determining one or more subsets of the secondary multidimensional analytical metadata;
    analyzing a tertiary multidimensional analytical metadata associated with the subsets of the secondary multidimensional analytical metadata;
    identifying one or more executable conditions for the subsets associated with the tertiary multidimensional analytical metadata, the secondary multidimensional analytical metadata and the primary multidimensional analytical metadata; and
    executing the tertiary multidimensional analytical metadata, the secondary multidimensional analytical metadata and the primary multidimensional analytical metadata based upon the corresponding executable conditions.

3. The computer implemented method of claim 2 further comprising:
    determining one or more calculation scenario executable tertiary multidimensional analytical metadata;
    determining one or more calculation scenario executable secondary multidimensional analytical metadata; and
    determining one or more calculation scenario executable primary multidimensional analytical metadata.

4. The computer implemented method of claim 1, wherein generating the runtime framework comprises: developing a generic runtime framework to determine one or more runtime executable environments to execute the multidimensional analytical metadata.

5. The computer implemented method of claim 1 further comprising: configuring the multidimensional analytical metadata by providing a configurable parameter to override one or more inexecutable conditions.

6. The computer implemented method of claim 1 wherein executing the multidimensional analytical metadata further comprises:
   detecting a runtime fallback, and
   providing a configurable parameter to override one or more inexecutable conditions and amend the runtime fallback.

7. The computer implemented method of claim 1, wherein executing the calculation pattern associated with the multidimensional analytical metadata further comprises:
   analyzing a multidimensional analytical metadata to determine a "COMBINATION" type of an associated calculation pattern;
   determining one or more calculation scenario executable multidimensional analytical metadata associated with the "COMBINATION" type;
   based upon the determined calculation scenario executable multidimensional analytical metadata, a processor of the computer determining one or more subsets of the multidimensional analytical metadata and corresponding one or more runtime decision rules associated with the "COMBINATION" type;
   determining one or more calculation scenario executable subsets of the multidimensional analytical metadata associated with the "COMBINATION" type; and
   based upon the determined calculation scenario executable subsets, executing the "COMBINATION" type of the calculation pattern in an in-memory calculation engine.

8. The computer implemented method of claim 1, wherein executing the calculation pattern associated with the multidimensional analytical metadata further comprises:
   analyzing a multidimensional analytical metadata to determine a "COMBINATION" type of an associated calculation pattern;
   determining one or more calculation scenario inexecutable multidimensional analytical metadata associated with the "COMBINATION" type; and
   based upon the determined calculation scenario inexecutable multidimensional analytical metadata executing the "COMBINATION" type of the calculation pattern in an application server.

9. The computer implemented method of claim 1, wherein executing the calculation pattern associated with the multidimensional analytical metadata further comprises:
   analyzing a multidimensional analytical metadata to determine a "COMBINATION" type of an associated calculation pattern;
   determining one or more calculation scenario executable multidimensional analytical metadata associated with the "COMBINATION" type;
   based upon the determined calculation scenario executable multidimensional analytical metadata, a processor of the computer determining one or more subsets of the multidimensional analytical metadata and corresponding one or more runtime decision rules associated with the "COMBINATION" type;
   determining one or more calculation scenario inexecutable subsets of the multidimensional analytical metadata associated with the "COMBINATION" type; and
   based upon the determined calculation scenario inexecutable subsets, executing the "COMBINATION" type of the calculation pattern in an application server.

10. The computer implemented method of claim 1, wherein executing the calculation pattern associated with the multidimensional analytical metadata further comprises:
    analyzing a multidimensional analytical metadata to determine a "VIRTUAL" type of an associated calculation pattern; and
    executing the "VIRTUAL" type of the calculation pattern in an application server.

11. The computer implemented method of claim 1, wherein executing the calculation pattern associated with the multidimensional analytical metadata further comprises:
    analyzing a multidimensional analytical metadata to determine a "PLANNING" type of an associated calculation pattern; and
    executing the "PLANNING" type of the calculation pattern in an application server.

12. The computer implemented method of claim 1, wherein executing the calculation pattern associated with the multidimensional analytical metadata further comprises:
    analyzing a multidimensional analytical metadata to determine a "BASIC" type of an associated calculation pattern;
    determining one or more calculation scenario executable multidimensional analytical metadata associated with the "BASIC" type; and
    based upon the determined calculation scenario executable multidimensional analytical metadata executing the "BASIC" type of the calculation pattern in an in-memory computing engine.

13. The computer implemented method of claim 1, wherein executing the calculation pattern associated with the multidimensional analytical metadata further comprises:
    analyzing a multidimensional analytical metadata to determine a "BASIC" type of an associated calculation pattern;
    determining one or more calculation scenario inexecutable multidimensional analytical metadata associated with the "BASIC" type; and
    based upon the determined calculation scenario inexecutable multidimensional analytical metadata executing the "BASIC" type of the calculation pattern in an application server.

14. An article of manufacture including a non-transitory computer readable storage medium to tangibly store instructions, which when executed by a computer, cause the computer to:
    analyze a multidimensional analytical metadata to determine a type of an associated calculation pattern;
    determine one or more subsets of the multidimensional analytical metadata and corresponding one or more runtime decision rules based upon the type of the calculation pattern, wherein the one or more subsets include one or more calculation scenario executable subsets and one or more calculation scenario inexecutable subsets;
    identify one or more executable conditions to execute the one or more subsets of the multidimensional analytical metadata; and
    based upon the executable conditions, generate the runtime framework by executing the calculation pattern associated with the multidimensional analytical metadata, wherein executing the calculation pattern comprises executing the one or more subsets of the multidimensional analytical metadata by executing the calculation scenario executable metadata in an in-memory calculation engine, and executing the calculation scenario inexecutable metadata in an application server.

15. The article of manufacture of claim 14 further comprising:
    to receive a primary multidimensional analytical metadata including the associated calculation pattern;
    to determine the type of the calculation pattern associated with primary multidimensional analytical metadata;

to analyze a secondary multidimensional analytical metadata associated with the type of the calculation pattern;

to determine one or more subsets of the secondary multidimensional analytical metadata;

to analyze a tertiary multidimensional analytical metadata associated with the subsets of the secondary multidimensional analytical metadata;

to identify one or more executable conditions for the subsets associated with the tertiary multidimensional analytical metadata, the secondary multidimensional analytical metadata and the primary multidimensional analytical metadata; and to execute the tertiary multidimensional analytical metadata, the secondary multidimensional analytical metadata and the primary multidimensional analytical metadata based upon the corresponding executable conditions.

16. A computing system to generate a runtime framework, comprising:

a processor to read and execute instructions stored in one or more memory elements; and the one or more memory elements storing instructions including:

a runtime analyzer to analyze a multidimensional analytical metadata and determine a type of an associated calculation pattern, to determine one or more subsets of the multidimensional analytical metadata and corresponding one or more runtime decision rules from a metadata buffer, wherein the one or more subsets include one or more calculation scenario executable subsets and one or more calculation scenario inexecutable subsets, and to identify one or more executable conditions from the metadata buffer, to execute the one or more subsets of the multidimensional analytical metadata; and a runtime execution engine to generate the runtime framework based upon the executable conditions by executing the calculation pattern associated with the multidimensional analytical metadata, wherein executing the calculation pattern comprises executing the one or more subsets of the multidimensional analytical metadata by executing the calculation scenario executable metadata in an in-memory calculation engine, and executing the calculation scenario inexecutable metadata in an application server.

17. The computing system of claim 16 further comprising: a fallback detector to detect a runtime fallback and provide a configurable parameter to override one or more inexecutable conditions and amend the runtime fallback.

* * * * *